(12) United States Patent  
Sivarajan

(10) Patent No.: US 9,725,813 B2  
(45) Date of Patent: Aug. 8, 2017

(54) PROTON EXCHANGE MEMBRANE LAYERS FOR FUEL CELLS AND RELATED APPLICATIONS

(71) Applicant: Ramesh Sivarajan, Shrewsbury, MA (US)

(72) Inventor: Ramesh Sivarajan, Shrewsbury, MA (US)

(*) Notice: Subject to any disclaimer, the term of this patent is extended or adjusted under 35 U.S.C. 154(b) by 0 days.

(21) Appl. No.: 15/467,488

(22) Filed: Mar. 23, 2017

(65) Prior Publication Data

US 2017/0200963 A1 Jul. 13, 2017

Related U.S. Application Data

(62) Division of application No. 14/236,820, filed as application No. PCT/US2012/049750 on Aug. 6, 2012, now Pat. No. 9,637,831.

(60) Provisional application No. 61/515,207, filed on Aug. 4, 2011.

(51) Int. Cl.
| | |
|---|---|
| *C25B 13/08* | (2006.01) |
| *H01M 8/1018* | (2016.01) |
| *H01M 8/1053* | (2016.01) |
| *H01M 8/1041* | (2016.01) |

(Continued)

(52) U.S. Cl.
CPC ............ *C25B 13/08* (2013.01); *H01M 8/1018* (2013.01); *H01M 8/1053* (2013.01); *H01M 8/1055* (2013.01); *H01M 8/0234* (2013.01); *H01M 8/1067* (2013.01); *H01M 2300/0082* (2013.01); *H01M 2300/0094* (2013.01)

(58) Field of Classification Search
None
See application file for complete search history.

(56) References Cited

U.S. PATENT DOCUMENTS

| | | |
|---|---|---|
| 2003/0017379 A1 | 1/2003 | Menashi |
| 2003/0133865 A1 | 7/2003 | Smalley et al. |
| 2003/0224168 A1 | 12/2003 | Mack et al. |

(Continued)

FOREIGN PATENT DOCUMENTS

| | | |
|---|---|---|
| JP | 2004-055311 A | 2/2004 |
| JP | 2004-199943 A | 7/2004 |

(Continued)

OTHER PUBLICATIONS

Alf, M. E. et al., "Chemical Vapor Deposition of Conformal, Functional, and Responsive Polymer Films," Advanced Materials, vol. 22, No. 18, pp. 1993-2027 (May 11, 2010).

(Continued)

*Primary Examiner* — Sarah A Slifka
(74) *Attorney, Agent, or Firm* — Wilmer Cutler Pickering Hale and Dorr LLP

(57) ABSTRACT

The present disclosure provides a membrane stack that includes a first polymer layer, a second polymer layer, and a nanostructured carbon material layer between the first polymer layer and the second polymer layer. In certain embodiments, the nanostructured carbon material layer includes a plurality of nanostructured carbon material intercalated with one or more proton conducting material or coated with one or more solid superacid particles. In some other embodiments, the first polymer layer and the second polymer layer are capable of transporting protons. The membranes described herein can be used as polymer electrolyte membranes in fuel cells and electrolyzers.

15 Claims, 8 Drawing Sheets

(51) Int. Cl.
H01M 8/1067 (2016.01)
H01M 8/0234 (2016.01)

(56) References Cited

U.S. PATENT DOCUMENTS

| | | |
|---|---|---|
| 2005/0287414 A1 | 12/2005 | Noh |
| 2006/0078765 A1 | 4/2006 | Yang et al. |
| 2006/0166069 A1 | 7/2006 | Min et al. |
| 2011/0048277 A1 | 3/2011 | Sivarajan et al. |
| 2012/0171574 A1 | 7/2012 | Zhamu et al. |

FOREIGN PATENT DOCUMENTS

| | | |
|---|---|---|
| JP | 2005-026119 A | 1/2005 |
| JP | 2009-094010 A | 4/2009 |
| WO | WO-2010/117392 A1 | 10/2010 |
| WO | WO-2010/144457 A2 | 12/2010 |

OTHER PUBLICATIONS

Chinese Office Action issued by the State Intellectual Property Office of People's Republic of China for Application No. 201280048630.5 dated Apr. 3, 2015 (20 pages).
Extended European Search Report issued by the European Patent Office for Application No. 12833543.7 dated Apr. 7, 2015 (6 pages).
International Search Report and Written Opinion issued by the U.S. Patent and Trademark Office as International Searching Authority for International Application No. PCT/US2012/049750 dated Apr. 8, 2013 (9 pages).
Thiam, H. S. et al., "Overview on nanostructured membrane in fuel cell applications," International Journal of Hydrogen Energy, vol. 36, pp. 3187-3205 (2011).

PROTON EXCHANGE MEMBRANE LAYERS FOR FUEL CELLS AND RELATED APPLICATIONS

RELATED APPLICATIONS

This application is a divisional application of U.S. patent application Ser. No. 14/236,820, filed May 5, 2014, which is the U.S. National Phase Entry Under 35 U.S.C. §371 of International Patent Application No. PCT/US2012/049750, filed Aug. 6, 2012, which claims the benefit of and priority to U.S. Provisional Patent Application No. 61/515,207, filed Aug. 4, 2011, which is hereby incorporated by reference in its entirety.

FIELD OF THE TECHNOLOGY

The present disclosure relates to fuel cells, especially proton exchange membrane fuel cells (PEMFC). In particular, the present disclosure relates to improved proton exchange membrane (PEM).

BACKGROUND

PEMs, such as polymer electrolyte membranes, are utilized to transport protons between the anode and cathode. Commercially available conventional PEM are composed generally of an ionomer, usually a polymer with a fluoropolymer backbone with pendants carrying an ionizable moiety like sulfonic acid groups. There are many variations and commercial products available. One of the well-known examples of the commercial PEM is NAFION.

Typically, fluoropolymer based PEM encounter many failure modes leading to lower operational life and a lower operational temperature around 80° C., and are thus prone to carbon monoxide poisoning. Major failure modes include water management issues like flooding, dry-out, poor dissipation of the heat generated, mechanical failures like pinholes or ruptures and electro osmatic drag arising from concentration polarization.

SUMMARY

A membrane stack for use in transporting protons in PEM fuel cells or electrolyzers is described. In certain embodiments, the membrane stack includes a first polymer layer, a second polymer layer, and a nanostructured carbon material layer between the first polymer layer and the second polymer layer is described.

A method of forming a membrane stack for use in transporting protons is described. In certain embodiments, the method includes providing a first polymer layer; providing a nanostructured carbon material layer; and providing a second polymer layer. In certain embodiments, the nanostructured carbon material layer is between the first polymer layer and the second polymer layer.

In certain embodiments, the nanostructured carbon material layer includes a plurality of nanostructured carbon material chemically modified or intercalated with one or more acids, super acids or other proton conducting material or coated with one or more solid superacid particles.

In certain embodiments, the first polymer layer and the second polymer layer are capable of transporting protons.

In certain embodiments, the nanostructured carbon material layer includes carbon nanotubes.

In certain embodiments, the carbon nanotubes include anions intercalated between the carbon nanotubes that are immobilized, wherein the corresponding protons are mobile.

In certain embodiments, the carbon nanotubes further include counteranions intercalated between the carbon nanotubes, wherein the counteranions are less mobile than the protons.

In certain embodiments, the carbon nanotubes intercalated with protons and counteranions are prepared by exposing the carbon nanotubes to one or more superacids.

In certain embodiments, the first polymer layer, the second polymer layer, or both the first and second polymer layers include an ionically conducting polymer.

In certain embodiments, the ionically conducting polymer includes a fluoropolymer derivatized with ionically conducting groups.

In certain embodiments, the ionically conducting polymer includes hydrophobic regions and hydrophilic regions.

In certain embodiments, the first polymer layer or the second polymer layer, or both the first and second polymer layers include a nanoporous polymer comprising pores that can be hydrated and thus are capable of transporting protons.

In certain embodiments, the size of the pores is from about 1 to about 100 nm.

In certain embodiments, the nanoporous polymer may include poly-ethylene, poly-propylene, poly-vinyledene fluoride (PVDF), poly-tetrafluoro ethylene, poly-styrene sulphonic acid, poly-vinyl chloride, poly-carbonate, fiber-glass membranes, copolymers thereof, or combinations thereof.

In certain embodiments, the nanostructure carbon material includes carbon nanotubes, amorphous nanostructure carbon, fullerenes, nanostructured carbon black, fullerenic black nanophasic graphite, or combinations thereof.

In certain embodiments, the carbon nanotubes are coated with one or more solid superacid particles.

In certain embodiments, a fuel cell that includes the membrane stack described herein is described.

In certain embodiments, an electrolyzer that includes the membrane stack described herein is described.

In certain embodiments, the method includes chemical modification of nanostructured carbon material (as described in herein) to be followed by coating uniformly and conformally an ionically conductive polymeric material.

In certain embodiments, the conformal coating of the chemically modified carbon nanotube material with an ionically conductive polymer such as NAFION can be accomplished through a chemical vapor deposition-polymerization (CVD-P) process. (See, e.g., Gleason et al., Advanced Materials, Vol. 22, pp. 1993-2027, 2010.)

In certain embodiments, the network of chemically modified carbon nanotubes can be reinforced with an inert matrix, woven or non-woven such as polymer or glass fiber membranes or clothes.

DETAILED DESCRIPTION OF THE DRAWINGS

The present disclosure is described with reference to the following figures, which are presented for the purpose of illustration only and are not intended to be limiting.

FIG. 1 shows an exploded view of a typical, conventional proton exchange membrane fuel cell (PEMFC) (100).

FIG. 2 shows a schematic cross section of a small bundle (210) of single-walled carbon nanotubes (SWCNT) (200). A hexagonal lattice formed by individual SWCNT (200) is intercalated with one or more intercalating species (240 and/or 250) in the triangular void space (220). The intercalation process can expand the spacing between the individual SWCNT (200) in accordance with certain embodiments.

FIG. 3 shows an image (300) obtained from a scanning electron microscope (SEM) of a typical dense film of single walled carbon nanotubes (SWCNT) on a rigid solid substrate in accordance with certain embodiments.

FIG. 4 shows a schematic diagram of a chemically modified, or intercalated CNT layer or film (420) to be employed in a proton exchange membrane fuel cell (PEMFC). An intercalated or chemically modified CNT supports free movement of protons and serves as a part of a Proton Reservoir and Intrinsic Mobility Enhancement (PRIME) stack (400). The CNT layer or film (420) is sandwiched by a polymer layer on either side, marked as 410 and 430 respectively in accordance with certain embodiments. The combination of 410, 420 and 430 form the modified proton exchange membrane (PEM) stack or PRIME stack (400) in accordance with certain embodiments.

DETAILED DESCRIPTION

Figure 1:
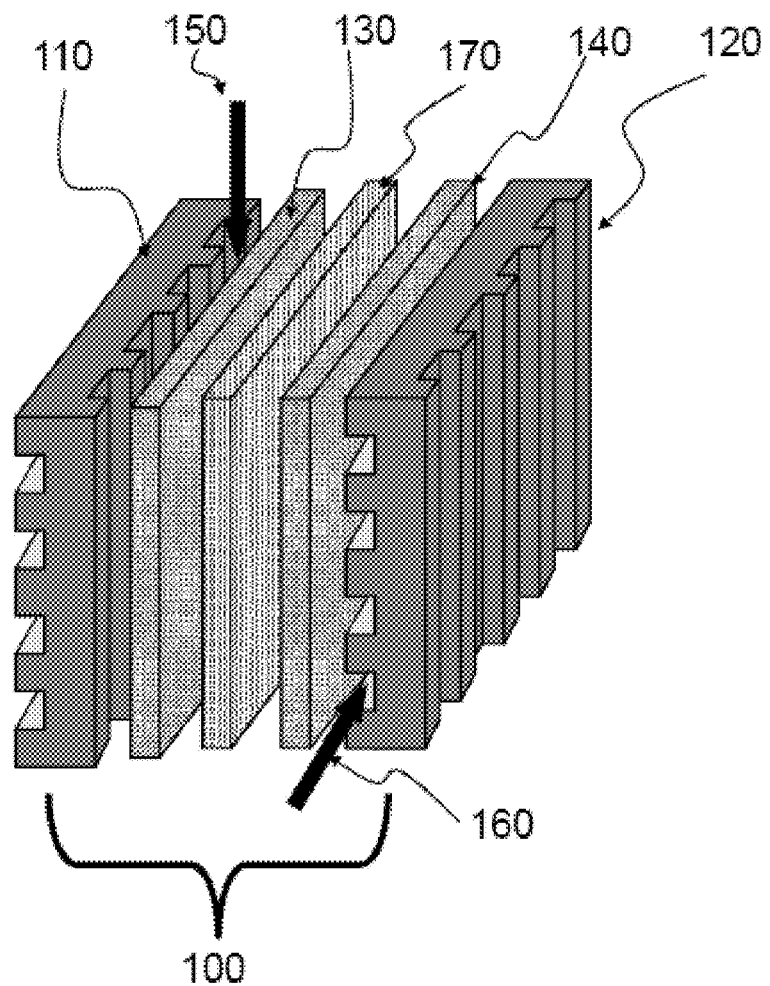

The exploded view of a conventional PEMFC (100) using hydrogen as fuel is shown in FIG. 1. The PEMFC includes of an inlet/outlet (I/O) flow plate for the hydrogen fuel gas (110) and similar gas flow plate for the oxygen side (120). It also includes a gas-diffusion layer and a catalyst support layer for the anode side (130), and for the cathode side (140) as shown. Gas flow paths for the hydrogen side (150) and the oxygen side (160) are marked accordingly.

Fuel hydrogen gas entering through the flow paths (150) on the anode side is ionized to protons and electrons on the catalyst surface at the anode (130). The protons transport through the PEM (170) and reach the cathode (140). The electrons leaving the anode travel through an external load (not shown) to reach the cathode, where they react with the oxygen/air supplied as oxidant through the flow channels (160) on the cathode side and form oxide anions. The protons reaching the cathode react with the oxide ions generated at the cathode to form water. The PEM (170) functions as the transport medium for the protons to travel from the anode to the cathode.

The present disclosure provides an improved PEM material. In certain embodiments, the improved PEM material can be provided as a single layer or as a stack of different materials. For example, the improved PEM material may include a sandwich structure or stack that includes a first polymer layer adjoining a film containing nanostructured materials followed by a second polymer layer or film. Such improved PEM material is also referred to in this disclosure as Proton Reservoir and Intrinsic Mobility Enhancement (PRIME) stack. Alternatively, the PRIME stack may be referred to as a modified PEM stack or a PRIME layer.

The present disclosure provides a PRIME stack that includes polymeric membranes and a layer of chemically modified nanostructured carbon materials (NCM).

The synthesized NCMs can be chemically modified to function as proton conducting materials. Such chemical modification can involve the intercalation of the NCMs with a proton conducting species, such as a superacid. In certain embodiments, such chemical modification can further include covalent or non-covalent chemical derivatization of the NCMs with chemical moieties containing ionizable groups that can release a proton (e.g., —COOH, SOOOH, POOOH etc.).

As used herein, "intercalation" refers to a material which is inserted between a host material to change the mean lattice spacing of the host material. In certain embodiments, intercalation can occur with either charge neutral host species (e.g., graphite) or with host species having charged galleries or spacings (e.g., clay). For example, in certain embodiments, intercalation refers to insertion of external species between the individual NCMs, such as those found in bundles of SWCNTs.

Also, as used herein, "proton" refers to a positively charged species, such as $H^+$, cations, and the like.

Suitable proton conducting species include any chemical species that can intercalate NCMs and that includes one or more ionizable protons to generate freely moving protons. For example, superacids that fall under various classes such as Bronsted superacids, Lewis superacids or conjugate Bronsted-Lewis superacids can be utilized.

Bronsted superacids includes acids with acidity being same or exceeding that of 100% sulfuric acid or 100% phosphoric acid. Some examples of Bronsted superacids include chlorosulfuric acid, perchloric acid, fluorosulfuric acid, fluorosulfonic acid, chlorosulfonic acid, and perfluoroalkanesulfonic acids among others.

Examples of Lewis superacids include arsenic pentafluoride, antimony pentafluoride, niobium pentafluoride and tantalum pentafluoride, among others. It should be noted that while Lewis superacids may not have a proton, they may be able to generate protons in the presence of water.

Examples of conjugate Bronsted-Lewis superacids include Oleum ($SO_3$ containing sulfuric acid), or polysulfuric acids, polyphosphoric acid-oleum mixtures, boric acid-sulfuric acid mixtures, fluorosulfuric acid-antimony pentafluoride among others examples of conjugate Friedel-Crafts acids can include $HBr:AlBr_3$ and $HCl:AlCl_3$ among others.

Various superacids discussed in U.S. Pat. No. 7,288,238, the contents of which is incorporated by reference herein in its entirety, can be utilized.

Suitable NCMs include carbon nanotubes (CNT), such as single walled carbon nanotubes (SWCNT), double walled carbon nanotubes (DWCNT), and multiwalled carbon nanotubes (MWCNT), amorphous nanostructured carbon, fullerenes, various forms of nanostructured carbon black, fullerenic black nanophasic graphite particles or a composition containing a combination of the above in different proportions.

CNT refers to a population of single walled carbon nanotubes (SWCNT) or double walled carbon nanotubes (DWCNT) or multiwalled carbon nanotubes (MWCNT) with more than two walls or a composition containing a combination of the above in different proportions.

CNT can also include non-tubular carbonaceous impurities such as nanoparticles of graphitic carbon or other forms of amorphous carbon impurities that are formed during synthesis, purification or dispersion of the carbon nanotubes. CNT may also include detectable levels of transition metal impurities such as iron, cobalt, nickel originating from the catalyst material used for the growth of carbon nanotubes.

Unless specifically referred to a given type of carbon nanotubes, the term CNT in the following descriptions refers to any of the types of carbon nanotubes or a combination of them along with varying degree of trace metal purity and other non-tubular carbonaceous impurities.

The CNT may be synthesized by any method including arc-discharge method, laser oven method, chemical vapor deposition method (CVD), floating catalyst CVD, high pressure carbon monoxide method (HiPco) or by combustion synthesis.

The CNT can be of any length, narrowly or broadly dispersed in terms of their lengths, diameter, bundle diameter and bundle length.

In the following descriptions, the present disclosure refers to a CNT layer, CNT film or a CNT membrane which corresponds to a non-woven mat of CNT of any thickness, size or shape.

In certain embodiments, individual CNT may have diameters that can range from 0.6 nm to 3 nm.

Figure 2:
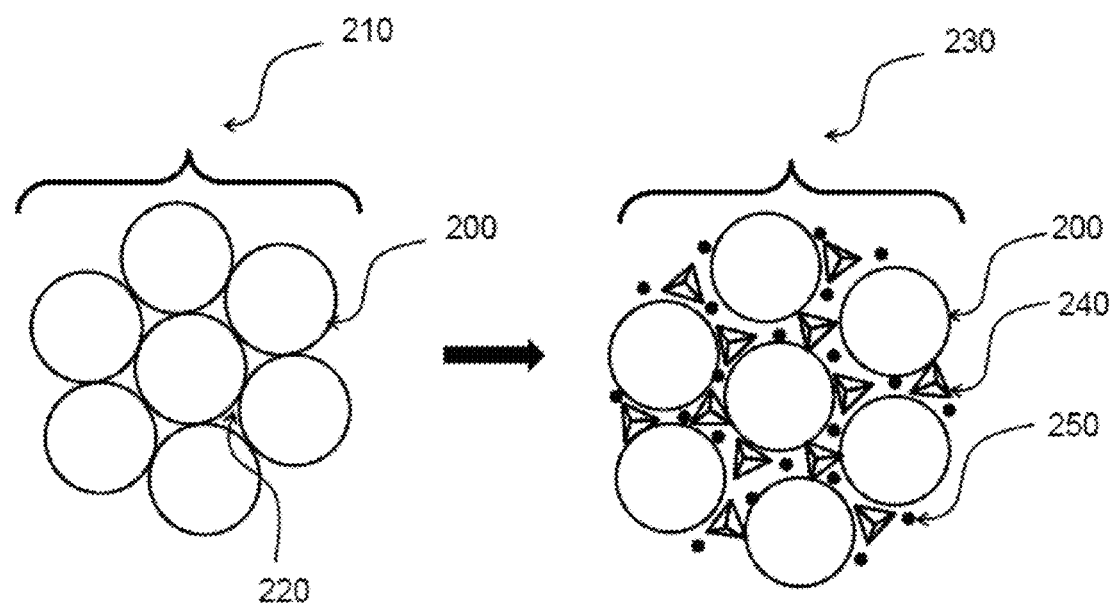

FIG. 2 shows an exemplary schematic cross section of an NCM, such as a bundle of CNT (210) (e.g., single-walled CNT), that have been intercalated with a proton conducting species, such as a superacid. It should be noted that while only one hexagonal lattice (one nanotube surrounded by six other nanotubes) is shown, one of ordinary skill in the art will readily understand that the NCM bundle cross sections may have few to several thousand nanotubes.

Taking the exemplary schematic of CNT intercalated with a superacid shown in FIG. 2, the cross section shows that the CNTs may have a mean separation distance between the CNTs, such as a mean separation distance that arise due to hexagonal packing of the nanotubes.

Without wishing to be bound by theory, the following mechanism may occur upon intercalation. The intercalating superacid molecules may enter the void space (220) between the CNTs. In certain embodiments, the superacid molecules and the CNT may have a chemical interaction including a weak charge transfer between the carbon and the intercalating species. Upon insertion into the void space (220) or prior to that, the superacid molecule may dissociate into a proton (250) and the corresponding conjugate base anion (240). In FIG. 2, the protons (250) are not shown in their hydrated form nor are they shown in stoichiometric number. At any rate, intercalation can lead to an expansion of the spacing between the individual CNTs (200), leading to an intercalated CNT lattice, shown as 230.

Moreover, due to the smaller size and ability to be hydrated in the presence of water, the protons may be mobile and lead to enhanced proton conductivity in the system. Particularly, the dissociated protons (250) may be more free to move throughout intercalated CNT lattice.

On the other hand, the conjugate base anion, due to its larger size and the chemical interaction with the carbon nanotubes, may be practically immobilized between the lattice spacings of the CNTs. In other words, the anions of the intercalating superacid molecule (240), once dissociated from the cations after intercalation, may be restricted in mobility.

However, it should be noted that the conjugate base anion (240) is schematically represented as a regular tetrahedral structure (240). However, depending on the nature of the intercalating proton conducting species, if a conjugate base anion is formed, it can have a variety of molecular shapes. Some exemplary shapes include regular tetrahedral, a distorted tetrahedral, a regular or distorted octahedral, trigonal, bi-pyramidal, or a planar structure in their regular or distorted forms.

Moreover, in certain embodiments, the intercalating proton conducting species may be polymerized, such as in the case of poly-sulfonic acids or polyphosphoric acids. Nevertheless, even in their polymerized form, the same illustration is utilized for simplicity.

In certain embodiments, any conjugate base anion species restricted in mobility due to the intercalation but charge balancing the dissociated protons that are free to move in the expanded lattice of the NCMs may be utilized.

In certain embodiments, the ratio of NCM to the proton conducting species can be 1 proton (or positively charged hydrogenion) to every 1000 carbons to an abundance of protons where there is up to a single proton for every carbon atom.

Figure 3:
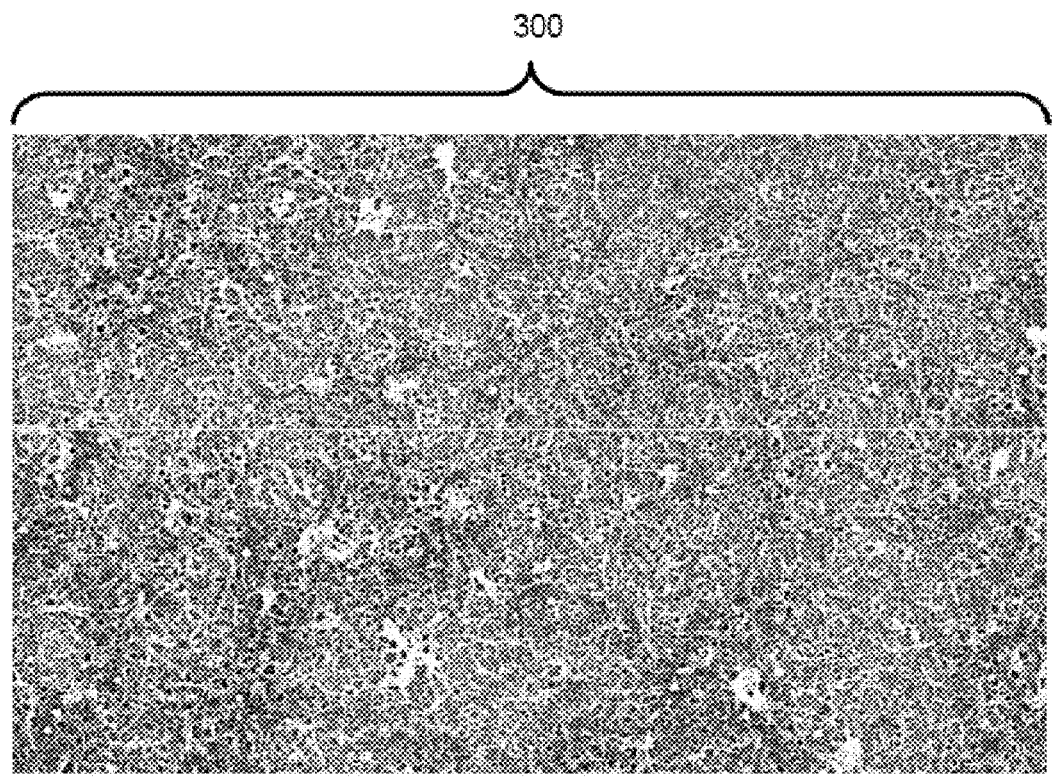

FIG. 3 shows a typical scanning electron microscope image of a dense network of single walled carbon nanotubes. The density of the carbon nanotubes can vary from a very sparse network to a dense and thick film of CNTs.

The CNT layer in the pristine form or chemically modified form may be obtained, followed by depositing from a dispersion of CNT in an organic solvent or a dispersion or ink of CNT in an aqueous suspension where the CNTs are suspended by a use of a cationic, anionic or polymeric or other types of commonly used surfactants.

The CNT layer may also be obtained depositing a surfactant free dispersion of CNTs in organic solvents, water or using dispersions with removable dispersible aid or viscosity adjustment agents. One such dispersion is described in detail by Sivarajan et al in US patent application publication number 2011/0048277.

In certain embodiments, the CNTs may be chemically derivatized in a co-valent or non-covalent fashion with pendant moieties that have ionizable groups.

Following deposition and/or dispersion, the CNT layers may be obtained using methods like filtration and transfer, spray coating, spin coating, dip coating, layer-by-layer coating, gravure coating, Meyer rod coating or ink jet printing, among other commonly known coating methods.

Figure 4:
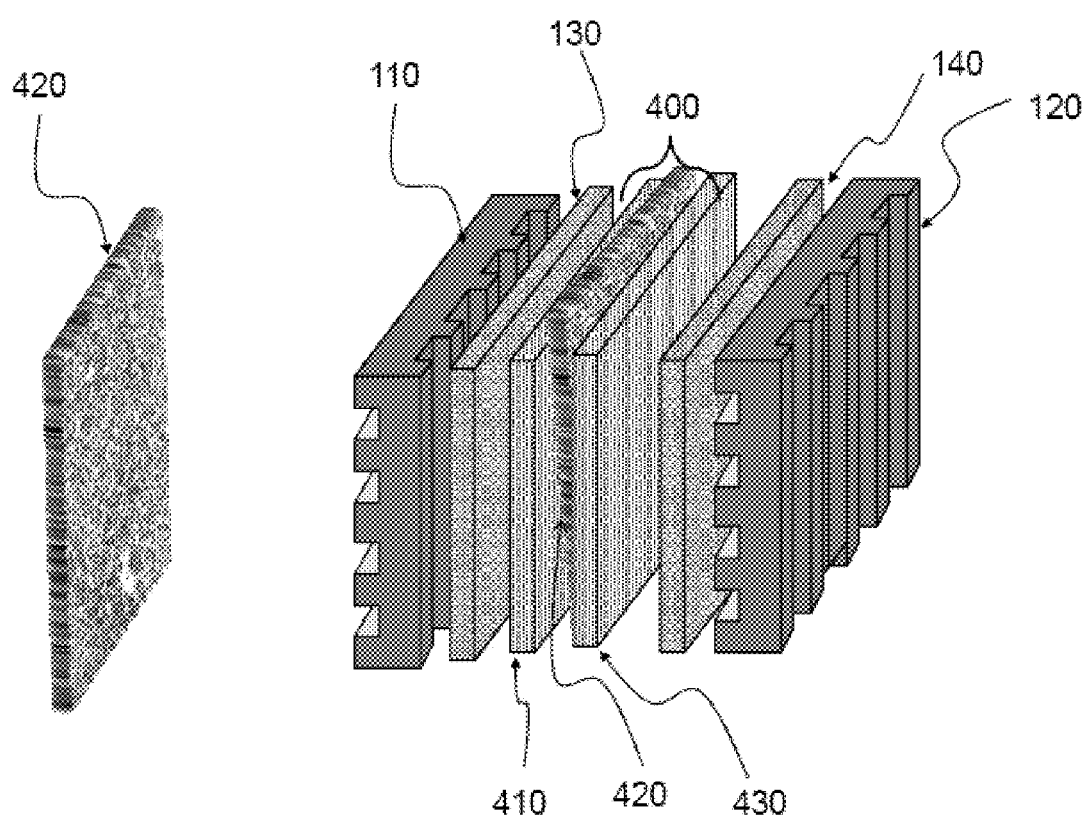

FIG. 4 shows a schematic diagram of a PEMFC having a PRIME stack. As shown, the PRIME stack includes a chemically modified/intercalated CNT layer or film (420). CNT layer or film 420 includes the chemically modified/intercalated CNT 230 shown in FIG. 2. Moreover, as shown in FIG. 4, PRIME stack further includes a sandwich structure or stack (400) that includes a polymer layer (410) adjoining the intercalated CNT layer or film (420) followed by a second polymer layer or film (430).

Figure 5:
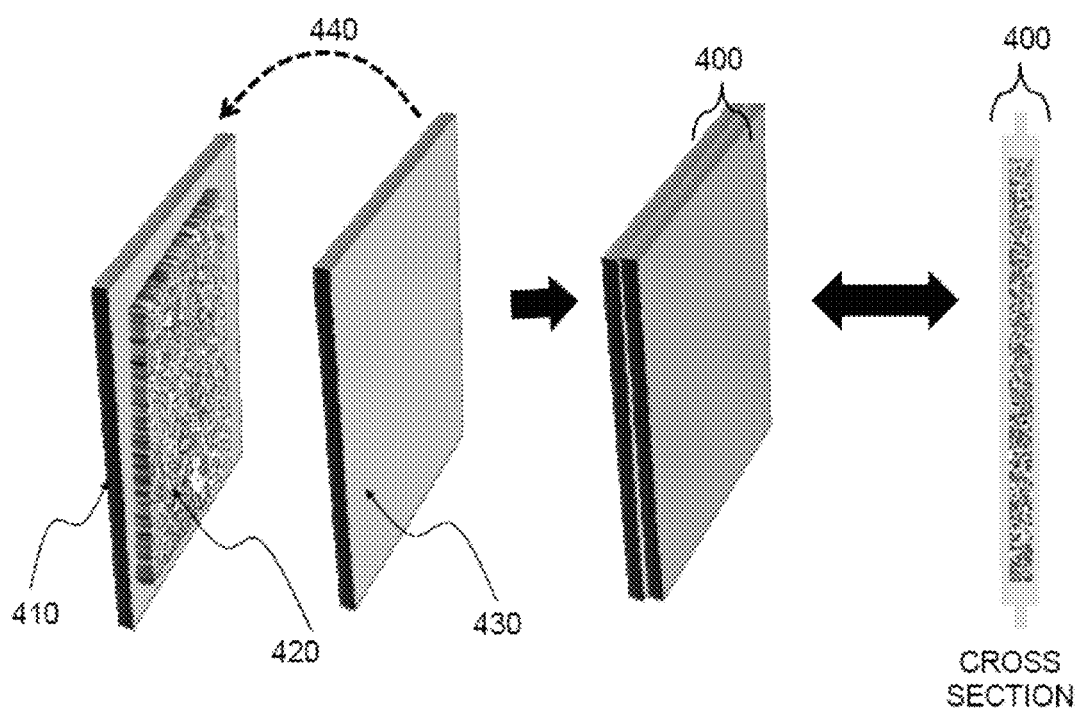
FIG. 5 shows a schematic diagram showing a method to produce the PRIME stack (400) shown in FIG. 4 in accordance with certain embodiments.

FIG. 5 shows one exemplary schematic of how the PRIME stack (400) shown in FIG. 4 can be constructed. In a first step, a layer of CNT is deposited on a polymer layer 410, leaving a CNT free area along the perimeter as shown. The deposited CNT layer is chemically treated to form the intercalated CNT film 420 on 410. On to the resulting structure, a polymer layer (430) of size at least as large as 410 is applied in a following step (440) resulting in the PRIME stack (400). The layers 410 and 430 encapsulate CNT film 420 as shown in the cross sectional view.

Figure 6:
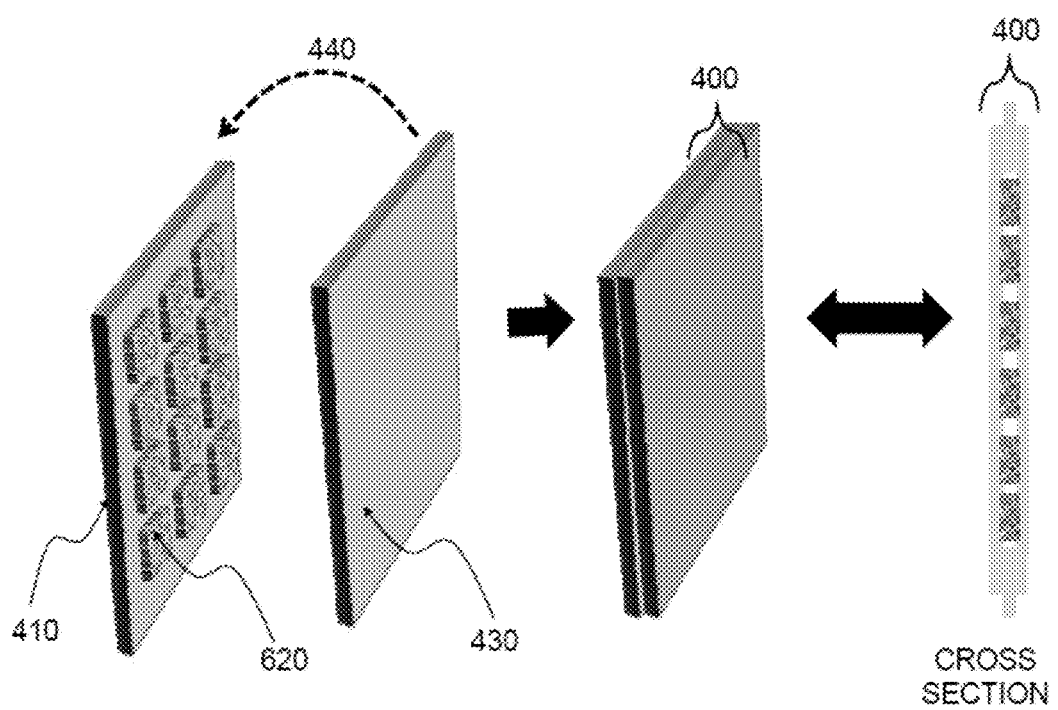
FIG. 6 shows an alternate method to produce the PRIME stack (400) shown in FIG. 4 in accordance with certain embodiments.

FIG. 6 shows an alternate method of how the PRIME stack (400) can be constructed with discontinuous patches of the CNT layer. In a first step, patches or islands of CNT are deposited on a polymer layer 410, leaving CNT free areas as shown. The deposited CNT patches or islands are chemically treated to form the intercalated CNT patches 620. On to the resulting structure, a polymer layer (430) of size at least as large as 410 is applied in a following step (440) resulting in the PRIME stack (400). The layers 410 and 430 encapsulate 620 as shown in the cross sectional view (400). The square shaped islands are only for illustration, they can vary in size, shape, thickness and method of formation. In one of the embodiments, the patches or islands can be screen printed on the surface of 410.

The application of the polymer layers (410) and (430) can be achieved by other methods as well. For example, the polymer can be dissolved in a suitable solvent and applied on either side (or both sides) of 420 or 620 by means of spray coating, spin coating, Meyer rod coating, reel to reel coating, ink-jet printing among others.

In yet another modification, the CNT can be intercalated and/or chemically modified and dispersed in an appropriate solvent system before their application on 410 to form 420 or 620. For example, NCMs, such as CNTs, may be introduced in a solution containing proton conducting species, such as a superacid. Some suitable concentration of the proton conducting species solution include 0.1% to 100%. In the case of oleum this can be as high as 107%. Some suitable amounts of CNT introduced into the proton conducting species solution include 0.01 wt % to 10 wt %. Upon dispersion of the CNTs into the solution, the proton conducting species may intercalate between the CNTs. Then, the dispersion can be cast in the form of a film or a layer. The polymer layers can be applied around the film containing NCMs intercalated with proton conducting species.

In certain embodiments, NCMs with particulate forms of the proton conducting species can be formed between the two polymer layers. Thereafter, a suitable solvent may be introduced to allow intercalation of the proton conducting species between the nanotubes.

In certain embodiments, the CNT layer is electrically isolated from the anode and cathode sides by the polymeric membrane parts 410 and 430. Without wishing to be bound by theory, this configuration may prevent or minimize carbon from being electrochemically oxidized to gaseous species during the operation of the PEM fuel cell.

Figure 7:
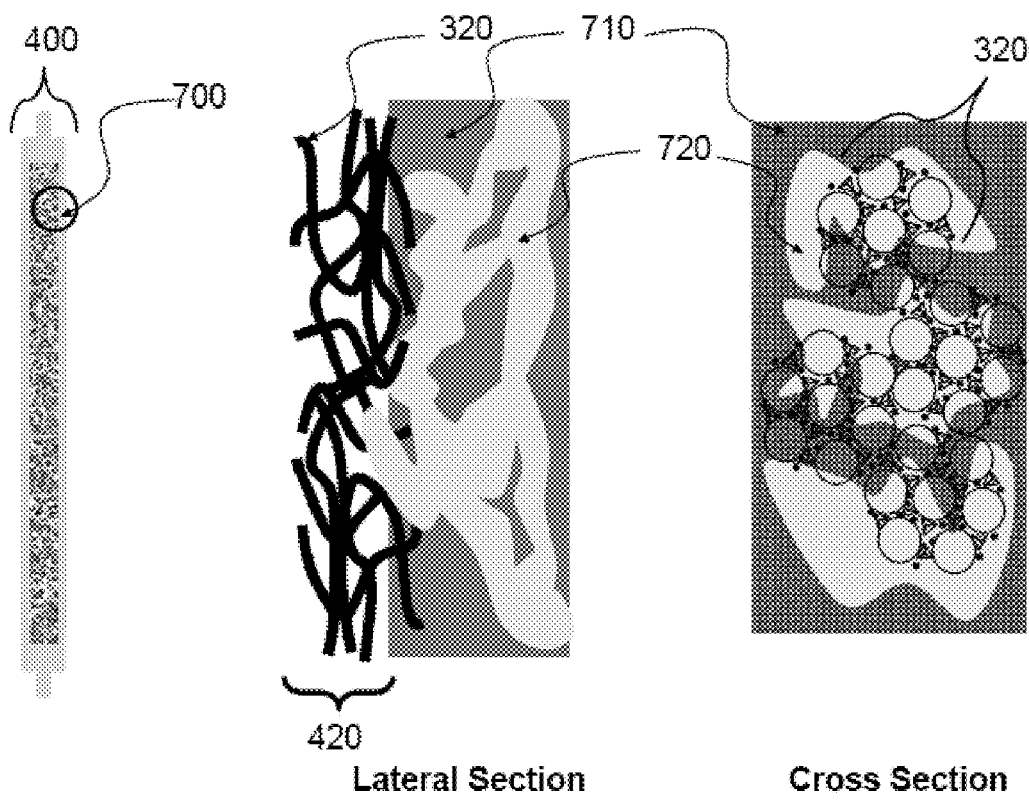
FIG. 7 shows a schematic of exemplary lateral section view and cross sectional view of the CNT-polymer interface (700) sandwiched between an ionomeric polymer, such as NAFION, in accordance with certain embodiments.

FIG. 7 shows the schematics of the lateral section and cross sectional views of the CNT-polymer interface (700) in the case of an ionomeric polymer like NAFION. In the cross sectional view, only the CNT hexagonal lattice oriented normal to the nanopores of the polymer are shown. Various models on the proton conduction mechanism in NAFION suggest a highly aggregated ionic regions called clusters. In a simplified view, the polymer includes interconnected domains that have hydrophobic regions (710) containing the polymer fluorocarbon backbone and hydrophilic regions (720) containing the ionic groups (sulphonic acid groups for example) and their counter ions. Ionic conduction in the polymer can take place through the free mobility of protons through the hydrophilic region. Cross sectional view shows one of the possible orientations where the termini of the intercalated CNT (320) bundles are normal to the polymer surface. However, as would be readily apparent to one of ordinary skill in the art, the CNT or the bundles need not necessarily orient normal to the ionomer surface for the free protons from the intercalated polymer to be transported through the hydrophilic region 720. The CNT or CNT bundles may lie parallel (or in any other configuration) to the ionomer surface.

Figure 8:
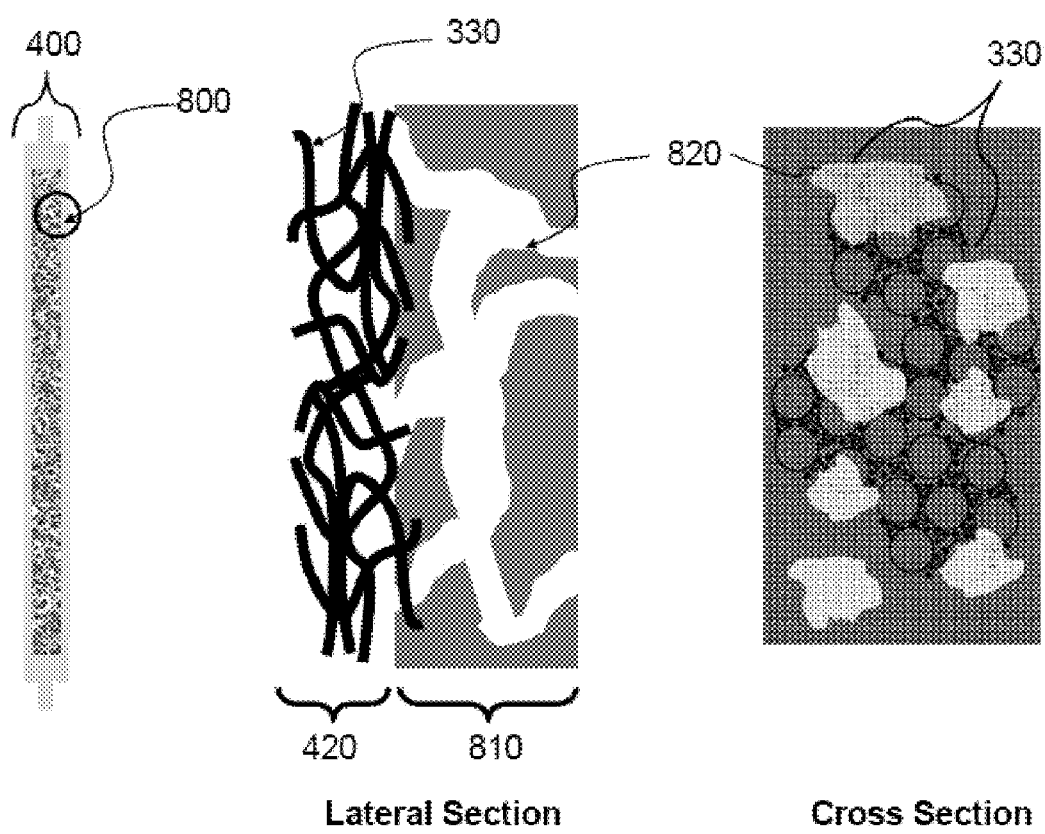
FIG. 8 shows a schematic of exemplary lateral section view and cross sectional view of the CNT-polymer interface (800) sandwiched by a non-ionomeric, porous polymer membrane in accordance with certain embodiments.

FIG. 8 shows a schematic of the lateral section and cross sectional views of the CNT-polymer interface (800) in the case of an non-ionomeric porous polymer membrane (810). In the cross sectional view, only the CNT hexagonal lattice oriented normal to the nanopores of the polymer are shown. The pores in the polymer membrane (820) are typically less than 100 nm so that the intercalated CNT material does not pass through the membrane. On the other hand the freely moving protons can be transported through the hydrated pores. Cross sectional view shows one possible orientation where the termini of the intercalated CNT (330) bundles are normal to the polymer surface. However, as would be readily apparent to one of ordinary skill in the art, the intercalated bundles need not orient normal to the pores for the transport of protons through the hydrated pores 820. The CNT or CNT bundles may lie parallel (or in any other configuration) to the ionomer surface.

Non-ionomeric polymer membrane (810) can include any suitable polymeric system. Non-exhaustive examples include poly-ethylene, poly-propylene, co-polymers of poly-ethylene or polypropylene with poly-ethylene oxides, poly-vinyledene fluoride (PVDF), co-polymers of poly-vinyledene fluoride with other polymers, poly-tetrafluoro ethylene, poly-styrene sulphonic acid, poly-vinyl chloride, poly-carbonate, fiber-glass membranes, and the like.

The pores can be modified to provide hydrophilicity where needed. For example, exposure to an oxidizing chemical ambience or exposure to oxygen plasma can be carried out.

Without wishing to be bound by theory, the improved proton conductivity by use of the intercalated carbon nanotubes (or NCM) may arise due to the following mechanism. Superacid can solvate the carbon nanotubes by direct protonation and enable the conjugate base anion of the superacid to intercalate between the bundles of carbon nanotubes to individual levels.

Though not necessary for the operation (due to the electrical isolation of the CNT network from the electrodes) the intercalation of the CNT with the conjugate base can also deplete the electrons of the first vanHove electronic states in the carbon nanotubes, rendering the carbon nanotubes as poor electronic conductors.

In another embodiment, the CNT layer can be coated with particles of inorganic solid superacids like tungstosilicic acid, tungstomolybdic acid, or titanium-niobic acids or other solid superacids instead of intercalation by them.

The PRIME stack (400) can also serve as a buffer layer for hydrated as well as free water capable of solvating the protons without hampering their mobility.

Further, the in-plane thermal conductivity of the carbon nanotube network in the PRIME stack (400) can provide for the uniform dissipation of the heat generated, allowing the operating temperature of the membrane to be increased significantly compared to conventional monolithic membranes.

Due to the increased operational temperature of the fuel cell, the tolerance to catalyst poisoning by carbon monoxide can be greatly increased.

A thinner Membrane Electrode Assembly (MEA) in a fuel cell may be possible as the CNT support network can lead to a lower temperature gradient across the thickness of the membrane leading to lower chances of dry-out.

In addition, a lower temperature gradient across the thickness of the membrane can minimize concentration polarization and hence minimization of electro-osmatic drag.

The high mechanical strength of the CNT network as part of the sandwich structure can further provide the mechanical integrity of the entire laminated stack as well the polymer membranes on either side, minimizing chances of mechanical ruptures, pinholes and the like even at elevated temperatures or at thinner polymer membrane thicknesses.

Depending on the polymer, intercalant and thicknesses involved, more than one set of (polymer-intercalated CNT-polymer) can be used within the MEA.

In yet another embodiment, the polymer membranes sandwiching the intercalated CNTs (410 and 430 in FIGS. 4, 5 and 6) can be block copolymer with or without nanopores (1 to 200 nm mean pore size).

In yet another embodiment, the polymer membranes sandwiching the intercalated CNTs (410 and 430 in FIGS. 4, 5 and 6) can be made of different polymers, different block co-polymers or a combination where one is a normal polymer and the other one is a block copolymer either or both with or without nano sized pores.

In yet another embodiment, a proton conductive material can be fabricated by conformally coating a network of chemically modified or intercalated carbon nanotubes with a layer of ionically conductive polymeric materials. One of the ways to make such conformal coating is the vapor phase deposition of the corresponding monomers on the intercalated carbon nanotube network followed by the surface polymerization of the monomers. For example, Gleason et al., Advanced Materials, Vol. 22, pp. 1993-2027, 2010, describes a chemical vapor deposition-polymerization (CVD-P) method as one suitable for making conformal coatings of fluoropolymers and conductive polymers.

In yet another embodiment, the proton conductive material can be mechanically strengthened by reinforcing the carbon nanotube network with an inert support, such as a woven or non-woven fabric made out of a structural polymer fiber or glass fibers or ceramic fibers. Such reinforced, carbon nanotube networks can be prepared by spray coating of carbon nanotube inks on the support fabrics, dipping/soaking of the support fabric in an ink/dispersion or filtration of a carbon nanotube ink/dispersion through the support fabric such that one or both the sides of the support network is/are deposited with a carbon nanotube/nanomaterial layer of desired thickness. Once such supported networks have been fabricated they can be treated as regular carbon nanotube networks for further processing as described in most of the embodiments in this application.

In certain embodiments, a fuel cell that contains the PRIME stack described herein is provided.

In yet other embodiments, one or more of the types of sandwich architecture, PRIME stack described in this present disclosure can be used in a PEM electrolyzer as opposed to a PEM fuel cell.

A PEM electrolyzer is a device where water is electrochemically split into hydrogen and oxygen using on externally supplied electric power. Such electrolyzers based on conventional PEM are known and have applications ranging from the cost effective production of hydrogen using renewable energy sources to the production of oxygen for critical applications as in a submarine.

It will be appreciated by one or ordinary skill in the art that many variations, modifications and other applications can be made. It will further be appreciated by one of ordinary skill in the art that the invention is not limited to what has been described above, but are provided merely to provide exemplary embodiments of the invention. Rather, the invention is limited solely by the claims that follow:

The invention claimed is:

1. A method of forming a membrane stack for use in transporting protons, the method comprising:
   providing a first polymer layer;
   providing a nanostructured carbon material layer; and
   providing a second polymer layer;
   wherein the nanostructured carbon material layer is between the first polymer layer and the second polymer layer;
   wherein the nanostructured carbon material is electrically isolated from an anode and a cathode by the first polymer layer and the second polymer layer; and
   wherein the nanostructured carbon material layer comprises a plurality of nanostructured carbon materials intercalated with one or more proton conducting materials or coated with solid superacid particles.

2. The method of claim 1, wherein the first polymer layer and the second polymer layer are capable of transporting protons.

3. The method of claim 1, wherein the nanostructured carbon material layer comprises carbon nanotubes.

4. The method of claim 3, further comprising exposing the carbon nanotubes to one or more superacids.

5. The method of claim 1, wherein the first polymer layer, the second polymer layer, or both the first and second polymer layers comprise an ionically conducting polymer.

6. The method of claim 1, wherein the first polymer layer, the second polymer layer, or both the first and second polymer layers comprise a nanoporous polymer comprising hydrated pores that are capable of transporting protons.

7. The method of claim 1, wherein the nanostructured carbon material includes carbon nanotubes, amorphous nanostructure carbon, fullerenes, nanostructured carbon black, fullerenic black nanophasic graphite, or combinations thereof.

8. The method of claim 1, further comprising providing a conformal coating of a polymer material on the nanostructured carbon material.

9. The method of claim 8, wherein the conformal coating of a polymer material is capable of transporting protons.

10. The method of claim 8, wherein the nanostructured carbon material comprises carbon nanotubes.

11. The method of claim 10, wherein the one or more proton conducting material comprises a superacid.

12. The method of claim 8, wherein the nanostructure carbon material comprises carbon nanotubes, amorphous nanostructure carbon, fullerenes, nanostructured carbon black, fullerenic black nanophasic graphite, or combinations thereof.

13. The method of claim 8, wherein the conformal coating of a proton conducting polymer on the nanostructured carbon material is obtained by a chemical vapor deposition of the monomer followed by polymerization.

14. The method of claim 13, wherein the nanostructured carbon material is mechanically strengthened through reinforcement by an inert support.

15. The method of claim 14, wherein the inert support comprises glass, polymeric fabrics, polymeric membranes, or combinations thereof.

* * * * *